United States Patent
Stolbikov et al.

(10) Patent No.: US 11,743,254 B2
(45) Date of Patent: Aug. 29, 2023

(54) DEVICE AUTHENTICATION ACROSS UNSECURE NETWORK

(71) Applicant: Lenovo (Singapore) Pte. Ltd., Singapore (SG)

(72) Inventors: Igor Stolbikov, Apex, NC (US); Rod D. Waltermann, Rougemont, NC (US); Joseph Michael Pennisi, Apex, NC (US); Michael Demeter, Roswell, GA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 374 days.

(21) Appl. No.: 16/538,335

(22) Filed: Aug. 12, 2019

(65) Prior Publication Data
US 2021/0051146 A1   Feb. 18, 2021

(51) Int. Cl.
*H04L 9/40*   (2022.01)
*H04L 9/08*   (2006.01)
*H04L 9/30*   (2006.01)

(52) U.S. Cl.
CPC .......... *H04L 63/0876* (2013.01); *H04L 9/088* (2013.01); *H04L 9/30* (2013.01); *H04L 63/0838* (2013.01)

(58) Field of Classification Search
CPC ............. H04L 63/0876; H04L 63/0838; H04L 63/0815; H04L 9/0841; H04L 9/0869
See application file for complete search history.

(56) References Cited

U.S. PATENT DOCUMENTS

| | | | | |
|---|---|---|---|---|
| 7,266,840 | B2* | 9/2007 | Gruber | H04L 63/0823 726/9 |
| 7,711,120 | B2* | 5/2010 | Kimmel | H04L 9/3234 380/279 |
| 8,850,037 | B2* | 9/2014 | McDonough | H04L 63/168 709/228 |
| 8,898,453 | B2* | 11/2014 | Preiss | H04L 63/0807 726/19 |
| 8,966,276 | B2* | 2/2015 | Nanopoulos | H04L 9/3228 713/183 |
| 9,146,881 | B2* | 9/2015 | Cousins | H04L 9/0822 |
| 9,300,473 | B2* | 3/2016 | Nix | H04L 63/0272 |
| 9,419,852 | B1* | 8/2016 | Heller | H04L 63/0823 |
| 9,792,593 | B2* | 10/2017 | Hayhow | G06Q 20/12 |
| 10,382,424 | B2* | 8/2019 | Kroehling | H04L 63/061 |
| 10,817,345 | B2* | 10/2020 | Arrasjid | H04L 41/5025 |
| 10,984,117 | B2* | 4/2021 | Shankar | G06Q 20/327 |
| 11,176,536 | B2* | 11/2021 | Huxham | G06Q 20/3229 |
| 2016/0224977 | A1* | 8/2016 | Sabba | G06Q 20/385 |

(Continued)

*Primary Examiner* — Zachary A. Davis
(74) *Attorney, Agent, or Firm* — Ference & Associates LLC

(57) ABSTRACT

One embodiment provides a method, including: receiving, at a server from a device, a request for device authentication across an unsecure network, the request including a device registration token; generating, at the server, a shared registration key utilizing the device registration token; verifying, at the server, the device registration token by comparing the device registration token to a function of the shared registration key; and producing, at the server and responsive to verifying the device registration token, a one-time activation token and sending the one-time activation token to the device. Other aspects are described and claimed.

18 Claims, 4 Drawing Sheets

(56) References Cited

U.S. PATENT DOCUMENTS

2017/0357967 A1* 12/2017 Sykora .................. H04L 63/126
2018/0309580 A1* 10/2018 Jeon ...................... H04L 9/0643
2020/0302043 A1*  9/2020 Vachon .................. G06F 21/32
2020/0374131 A1* 11/2020 Davis .................... H04L 9/0637

* cited by examiner

DEVICE AUTHENTICATION ACROSS UNSECURE NETWORK

BACKGROUND

Frequently devices (e.g., smartphones, tablets, laptop computers, augmented reality devices, desktop computers, etc.) are used to connect to secure services (e.g., cloud services, banking websites, secure virtual-private-network (VPN) connections, etc.). To make these connections the devices are verified utilizing a verification server associated with the secure service. In the case that a device that has been previously verified with the verification server cannot connect directly to the verification server, for example, the device is utilizing an unsecure network channel or a network channel not recognized by the secure service, the secure service traditionally utilizes a one-time authentication token that is sent to the device. Either the device is able to automatically verify the authentication token, or a user manually inputs the authentication token into a window or other input area associated with the secure service. Upon verifying the authentication token is correct, the secure service allows the device to connect to and access the requested service.

BRIEF SUMMARY

In summary, one aspect provides a method, comprising: receiving, at a server from a device, a request for device authentication across an unsecure network, wherein the request comprises a device registration token; generating, at the server, a shared registration key utilizing the device registration token; verifying, at the server, the device registration token by comparing the device registration token to a function of the shared registration key; and producing, at the server and responsive to verifying the device registration token, a one-time activation token and sending the one-time activation token to the device.

Another aspect provides an information handling device, comprising: a processor; a memory device that stores instructions executable by the processor to: receive, at a server from a device, a request for device authentication across an unsecure network, wherein the request comprises a device registration token; generate, at the server, a shared registration key utilizing the device registration token; verify, at the server, the device registration token by comparing the device registration token to a function of the shared registration key; and produce at the server and responsive to verifying the device registration token, a one-time activation token and send the one-time activation token to the device.

A further aspect provides a product, comprising: a storage device that stores code, the code being executable by a processor and comprising: code that receives, at a server from a device, a request for device authentication across an unsecure network, wherein the request comprises a device registration token; code that generates, at the server, a shared registration key utilizing the device registration token; code that verifies, at the server, the device registration token by comparing the device registration token to a function of the shared registration key; and code that produces, at the server and and responsive to verifying the device registration token, a one-time activation token and send the one-time activation token to the device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
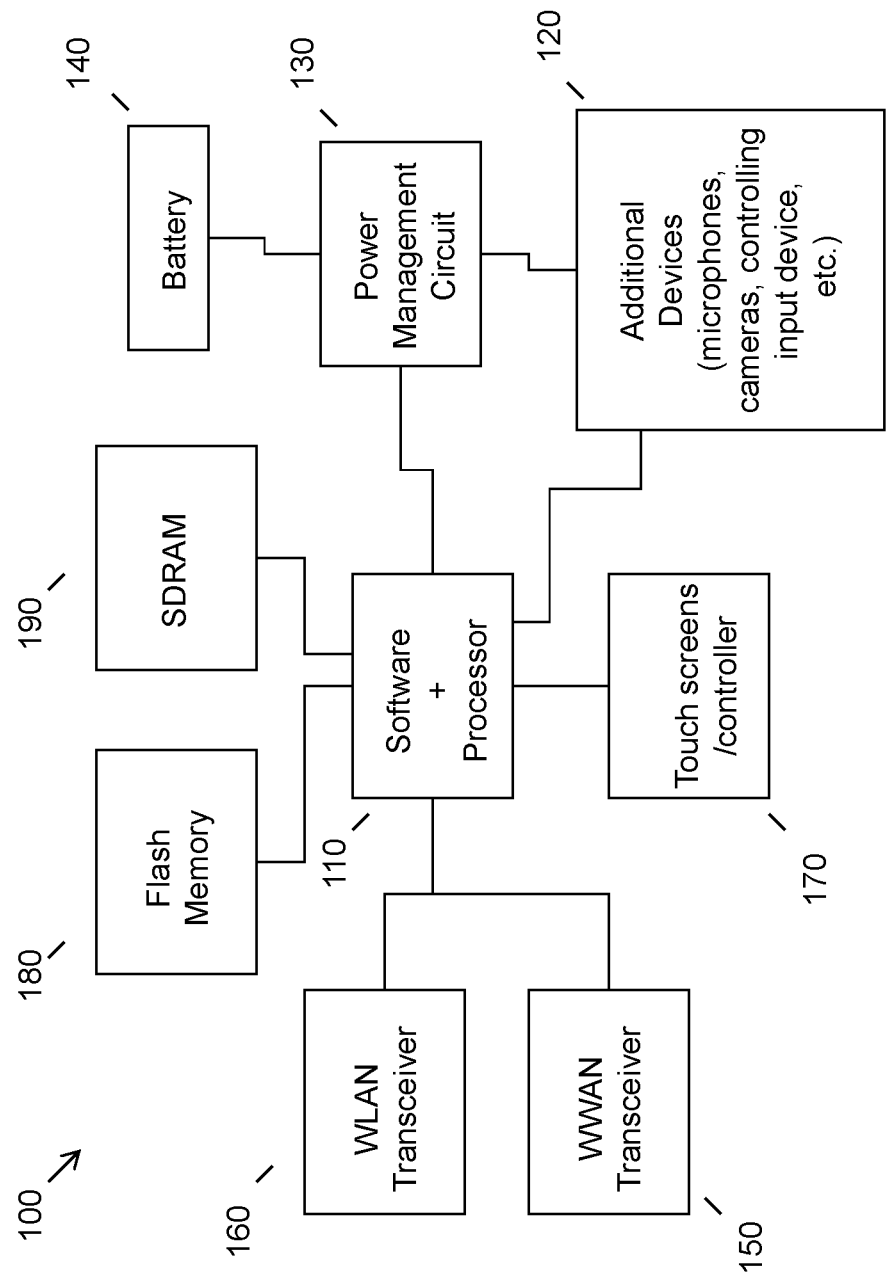
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The use of a one-time authentication token allows an information handling device (e.g., smartphone, tablet, computer, augmented reality device, wearable device, etc.) to connect to a secure service (e.g., financial website, secure VPN, website having a user's confidential information, etc.) when the device does not have the ability to connect directly to the verification server. Additionally, such one-time authentication tokens allow for device verification when the device or network is not recognized by the secure service, for example, a user is accessing the secure service for the first time on a new device, when a user is accessing a secure service utilizing a new network connection, or the like. Particularly because portable information handling devices are so common, the volume of accesses to secure services using unsecure networks is increasing and becoming very commonplace. For ease of readability the term unsecure networks is utilized here throughout. However, the term unsecure networks is intended to encompass not only unsecure networks, but also networks, which may be secure or unsecure, unknown to or unrecognized by the secure service or any other type of network connection that would require the use of a one-time authentication token.

A problem with the traditional technique for authenticating devices utilizing a one-time authentication token is that the generation of the token is based upon sharing credentials between the device and the secure service. This sharing of credentials allows for brute force attacks where another user or system continually tries different combinations of usernames and passwords in order to identify the credentials associated with a person. Once the credentials are identified, the attacker can use this information to get a one-time authentication token at a device possessed by the attacker and then access the secure service under the guise of the actual user. Additionally, these types of authentication are susceptible to denial-of-service attacks wherein another user or systems attempts to make the secure service unavailable to the actual user by providing too many failed credential attempts.

An additional problem is that in many cases the one-time authentication token is only updated when a user initiates the protocol. In other words, a new authentication token is only created when a new token is requested. Thus, between the time that a token is requested and a new token is subsequently requested, the first token is generally still valid. This means that an attacker has an amount of time between the first token and when a new token is requested to attempt to identify the token value. If a user does not initiate the protocol frequently, then this length of time could be substantial. Additionally, since these tokens are generally short, for example, six to ten characters in length, utilizing traditional attacking algorithms, these tokens can be identified in a relatively short period of time. Further adding to the problem is that traditionally the tokens only include numbers, which greatly reduces the number of possible combinations for the tokens, and, thereby, greatly reduces the amount of time needed to identify the token value by an attacker.

Some conventional solutions have been to add shared secrets to the authentication protocol. In such a situation, the user selects and/or otherwise provides a secret to the verification server. A request for this secret can then be provided to the user when the server is presented with an unverified device. However, if the verification server is compromised due to an attack or other reason, then the secrets can be revealed. Thus, the authentication system is no longer secure and the security of the entire authentication program is negated. In other words, such a system does not respect the zero-trust security principle. Other conventional solutions require a large amount of data to be shared between the communicating parties, which becomes unusable, particularly as the devices used to access the secure services become smaller and have less input options.

Accordingly, an embodiment provides a method for authenticating a device across an unsecure network utilizing a device registration token. Instead of creating a random one-time authentication token that is only updated when the protocol is initiated, the described system and method creates a one-time authentication token that is based upon a device registration token. When a secure service or server receives a request for device authentication from a device over an unsecure network, the device also sends a device registration token with the request. The device registration token is generated from a shared registration key that is based upon a private key of the device and a public key of the server. When the server receives the request, the server generates a shared registration key from the device registration token and a private key of the server. The server then verifies the device registration token by comparing the device registration token to a function of the shared registration key. Upon successful verification, the server produces and sends a one-time activation token to the device. The user or device can then use this one-time activation token as traditional one-time activation tokens are used. However, because the one-time activation token is generated from a device registration token, the system can ensure that the device is a verified device even when the device is unable to connect directly to the verification server, thereby mitigating denial-of-service and brute force attacks while maintaining usability and security requirements.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O (Input/Output) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA (Serial Advanced Technology Attachment) or PCI (Peripheral Component Interconnect) or LPC (Low Pin Count). Common interfaces, for example, include SDIO (Secure Digital Input/Output) and I2C (Inter-Integrated Circuit).

There are power management chip(s) 130, e.g., a battery management unit BMU, which manage power as supplied, for example, via a rechargeable battery 140, which may be recharged by a connection to a power source (not shown). In at least one design, a single chip, such as 110, is used to supply BIOS (Basic Input/Output System) like functionality and DRAM (Dynamic Random-Access Memory).

System 100 typically includes one or more of a WWAN (Wireless Wide Area Network) transceiver 150 and a WLAN (Wireless Local Area Network) transceiver 160 for connecting to various networks, such as telecommunications networks and wireless Internet devices, e.g., access points. Additionally, devices 120 are commonly included, e.g., an image sensor such as a camera, audio capture device such as a microphone, controlling input device such as a mouse and keyboard, dedicated gaming controller or joystick, etc. System 100 often includes one or more touch screens 170 for data input and display/rendering. System 100 also typically includes various memory devices, for example flash memory 180 and SDRAM (Synchronous Dynamic Random-Access Memory) 190.

Figure 2:
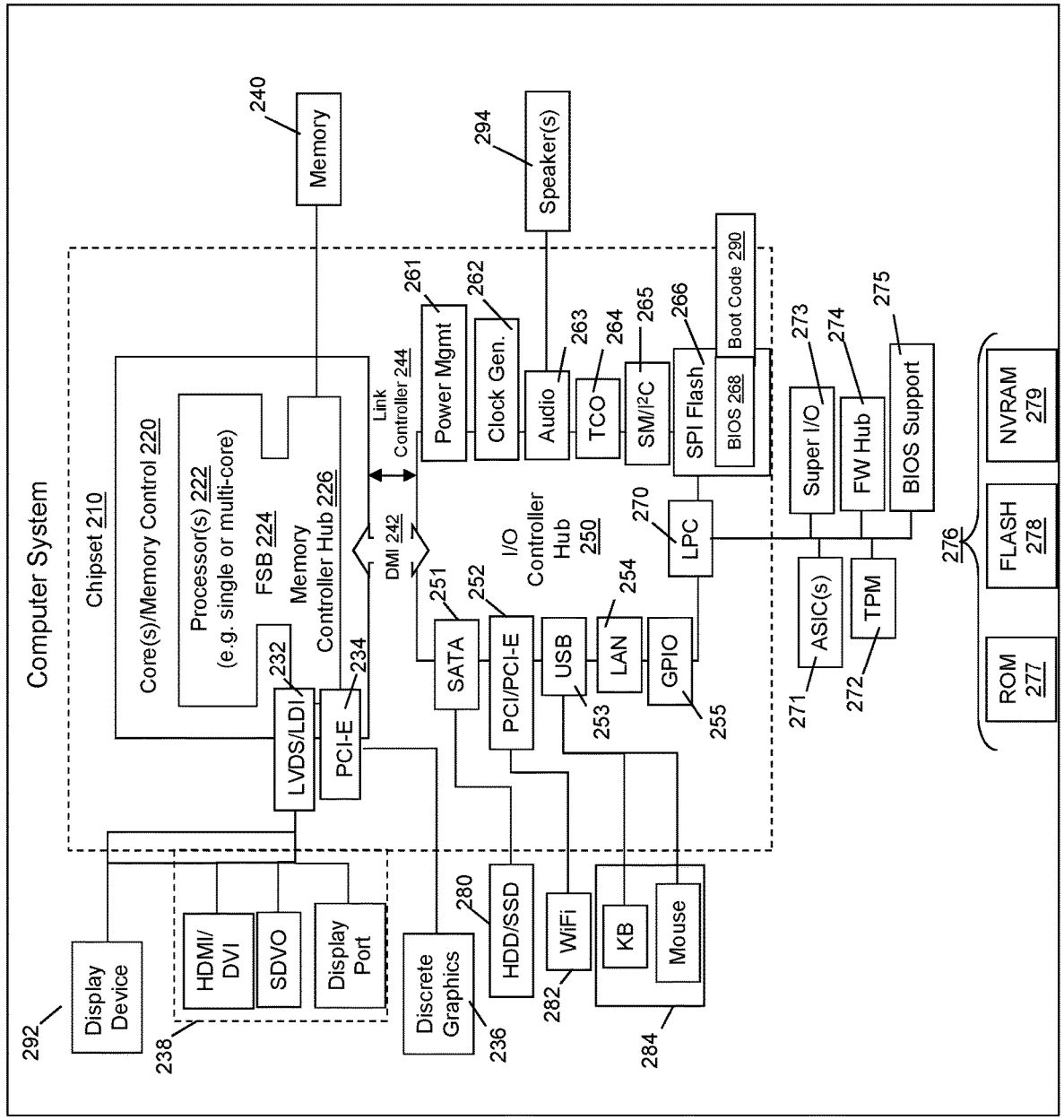
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, also referred to as chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224. It should be noted that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM (Random-Access Memory) that may be referred to as "system memory" or "memory"). The memory controller hub 226 further includes a low voltage differential signaling (LVDS) interface 232 for a display device 292 (for example, a CRT (cathode-ray tube), a flat panel, touch screen, etc.). A block 238 includes some technologies that may be supported via the LVDS interface 232 (for example, serial digital video, HDMI/DVI (High-Definition Multimedia Interface/Digital Visual Interface), display port). The memory controller hub 226 also includes a PCI-express interface (PCI-E) 234 that may support discrete graphics 236.

In FIG. 2, the I/O hub controller 250 includes a SATA interface 251 (for example, for HDDs (Hard Disk Drives), SDDs (Solid State Drives), etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN (Local Area Network)), a GPIO (General Purpose Input/Output) interface 255, a LPC interface 270 (for ASICs (Application-Specific Integrated Circuits) 271, a TPM (Trusted Platform Module) 272, a super I/O 273, a firmware hub 274, BIOS support 275 as well as various types of memory 276 such as ROM (Read-Only Memory) 277, Flash 278, and NVRAM Non-Volatile Random-Access Memory) 279), a power management interface 261, a clock generator interface 262, an audio interface 263 (for example, for speakers 294), a TCO (Time Controlled Operations) interface 264, a system management bus interface 265, and SPI (Serial Peripheral Interface) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices utilized by users to access secure service. Additionally or alternatively, the circuitry may be used in devices supporting secure services. For example, the circuitry outlined in FIG. 1 may be implemented in a smart phone or tablet embodiment, whereas the circuitry outlined in FIG. 2 may be implemented in a laptop.

Figure 3:
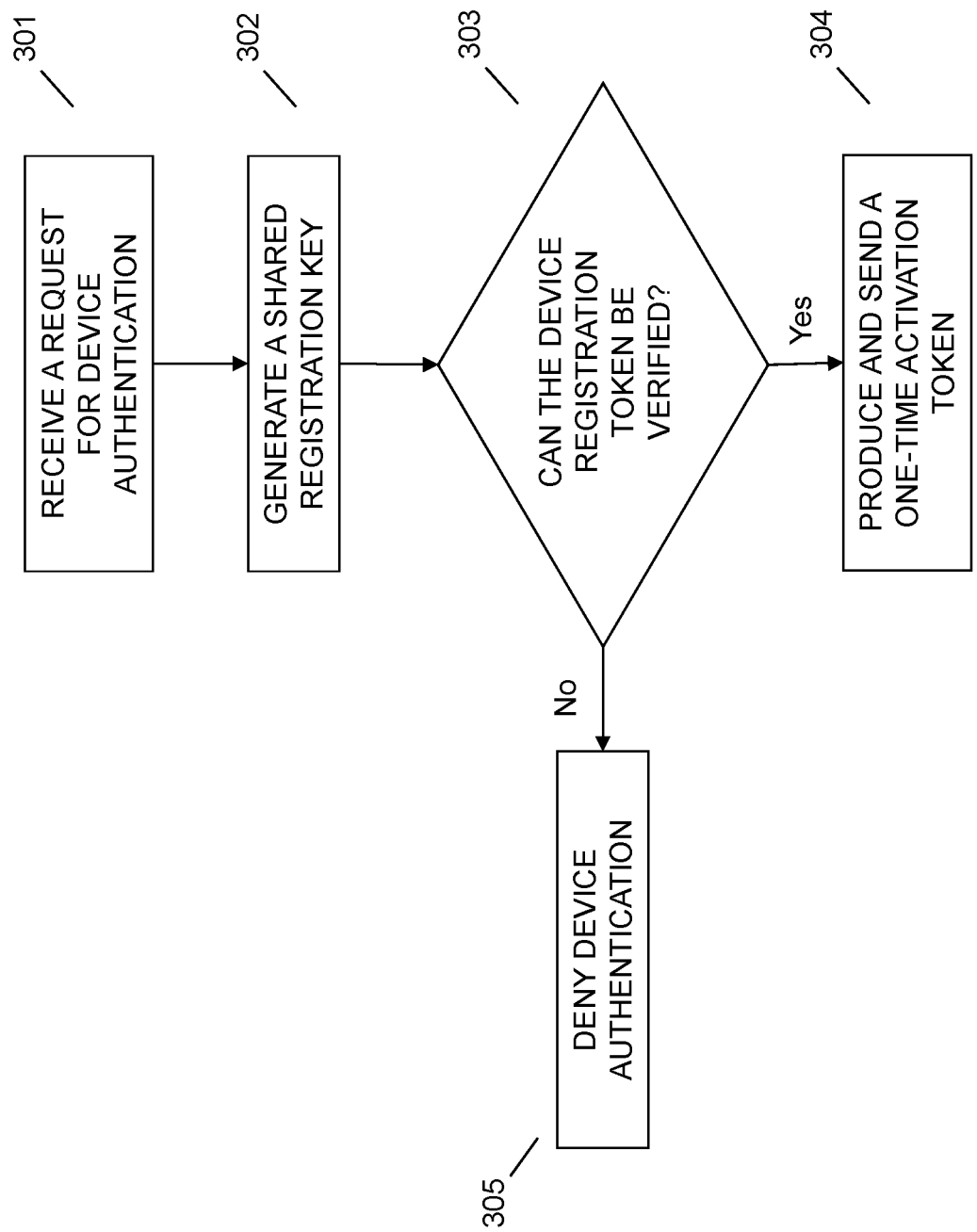
FIG. 3 illustrates an example method of authenticating a device across an unsecure network utilizing a device registration token.

Referring now to FIG. 3, an embodiment may authenticate a device across an unsecure network utilizing a device registration token. At 301 a server, for example, a secure services server, may receive a request from a device of a user. The request may be a request to access the secure service, and may, therefore, include a request for authenticating the device to access the secure service. Since the request may be received across an unsecure network, for example, a truly unsecure network, a network, whether secure or unsecure, unknown to the secure service, or the like, the secure service may need further validation that the requesting device is trusted to access the secure service. Thus, the request may include a device registration token.

The device registration token is unique to a particular device, specifically because the device registration token is generated using information unique to the device. To generate the device registration token, the device may first generate a shared registration key. The shared registration key may be generated using any of a plurality of key agreement protocols. The one that will be discussed herein is the elliptic-curve Diffie-Hellman (ECDH) protocol or algorithm. However, any key agreement protocol known in the art can be used. These key agreement protocols work via establishing a shared secret that can be used by both the device and the server. The protocol utilizes a public-private key pair to generate the shared secret. Thus, both the device and the server have public and private key pairs, for example, elliptic-curve cryptography (ECC) keys. The device is preconfigured with a private/public key pair and also has the public key of the server. Each of these keys and/or key pairs is based upon preset encryption parameters and a named curve use. The server has access to a preconfigured database of all the public keys of the devices. This database is stored in a secure location and accessible to the server.

To generate the shared registration key on the device, the device utilizes the key agreement protocol. As mentioned before, the protocol utilizes a public-private key pair to generate the shared secret. In this case, the shared secret is the shared registration key. The key pair used to generate the shared registration key on the device is the private key of the device and the public key of the server. From the shared registration key, the device calculates the device registration token. The device registration token may be calculated or generated using different algorithms or functions. These algorithms or functions may be chosen based upon different factors, for example, a risk of attack, the type of attack that may be utilized, or the like. For example, in the case that an attack is not a risk, the device registration token may simply be derived from the shared registration key. On the other hand, if there is a risk of a brute force or other type of attack, the algorithm may include a Proof of Work function.

The Proof of Work function may use a device identifier, nonce, and sequence number for the device. The sequence number is uniquely preset for each of the devices and is known to both the device and the server. For example, the sequence number may be derived from the device identifier and the device public key. An example function for calculating the device registration token may be Truncate(HMAC (SRK+Proof of Work function)). HMAC is a hash-message-authentication code. The truncate function may be utilized to ensure that the length of the token is within a particular length to ensure usability. For example, the token may be truncated to six to ten characters. Similarly, the nonce length and/or range may be chosen based upon similar parameters. In the case that a Proof of Work function is utilized, the nonce may be sent to the server in addition to the device registration token in addition to being stored on the device. Additionally, for further validation, the device may also store a timestamp associated with the device registration token and nonce, if utilized.

At 302 the server may generate a shared registration key from the device registration token. The server generates the shared registration key in a manner similar to how the device generated the shared registration key. However, instead of using the device private key and server public key, the server utilizes the device registration token for the device and the server private key. Additionally, if a Proof of Work function was utilized by the device, the server may calculate and verify the Proof of Work as a hash of the device identifier and nonce, both of which were received from the device. However, this step may be omitted. Generation of the shared registration key at the server utilizes the same key agreement protocol utilized by the device. While different key agreement protocols can be used other than the ECDH algorithm, the key agreement protocol that is utilized must be the same on both the device and the server in order to generate shared registration keys that are complementary and that can be verified by both the device and the server.

At 303 the server determines whether the device registration token received from the device can be verified. To verify the device registration token, the server may compare the device registration token to a function of the shared registration key. If a Proof of Work function was utilized, the function of the shared registration key may be a function of the Proof of Work and the shared registration key and possibly the sequence number corresponding to the device. The result of this function may also be truncated to a particular length based upon usability requirements. An example function may be Truncate(HMAC(Shared Registration Key, Proof of Work+sequence number)).

On the other hand, in the case where a Proof of Work function was not utilized, the function of the shared registration key may simply be a derivation of the shared registration key, for example, a truncated version of the shared registration key, where the shared registration key is truncated to fit the usability requirements (e.g., based upon a length of the token, etc.). As another example, the derivation of the shared registration key may be a function of the shared registration key and the sequence number corresponding to the device. This function may also be truncated. As a final example, the derivation of the shared registration key may be an HMAC of either the shared registration key alone or the shared registration key and the sequence number. This may also be truncated.

If the device registration token cannot be verified at 303, the system may deny the device authentication at 305. In other words, the server may deny the device access to the secure services. If, on the other hand, the device registration token is verified at 303, the server may produce and send a one-time activation token to the device at 304. The one-time activation token may be generated based upon a function of the device registration token and other values. For example, the one-time activation token may be generated from the device registration token, shared registration key, and an increment of the sequence number corresponding to the device. More, less, or different values may be used in generating the one-time activation token. Additionally, the resulting value of the function may be truncated to fit within the usability parameters, for example, the value may be truncated to six to ten characters. An example one-time activation token function may be Truncate(HMAC(shared registration key+device registration token+incremented sequence number)). This one-time activation token is then sent to the device.

Upon receiving the one-time activation token, the device verifies the one-time activation token. To verify the one-time activation token the client performs the same function that was performed by the server in generating the one-time activation token. In other words, the device may effectively generate the one-time activation token and then compare that generated token to the token that was received from the server. If the two values match, then the one-time activation token is verified and the device is authenticated for access to the secure service. If, on the other hand, the tokens do not match, then the one-time activation token is not validated and rejected. The device may then require the process be restarted for authentication of the device. While different functions for creating the one-time activation token may be utilized, the same function must be used at both the server and the device so that the one-time activation tokens could match if they are authentic. Thus, using the example used at the server side, the function utilized by the device to verify the one-time activation token may be Truncate(HMAC (shared registration key+device registration token+incremented sequence number)).

The verification may also include a response time verification, which determines whether the one-time authentication token was received within an allowed time frame. To make this verification the device compares the receipt time of the one-time authentication token with the timestamp that was previously stored with respect to generation of the device registration token. If the time is within the allowed time frame, then the verification is complete. If the time is not within the allowed time frame, then the device may reject the one-time activation token and require that the authentication process start over.

Figure 4:
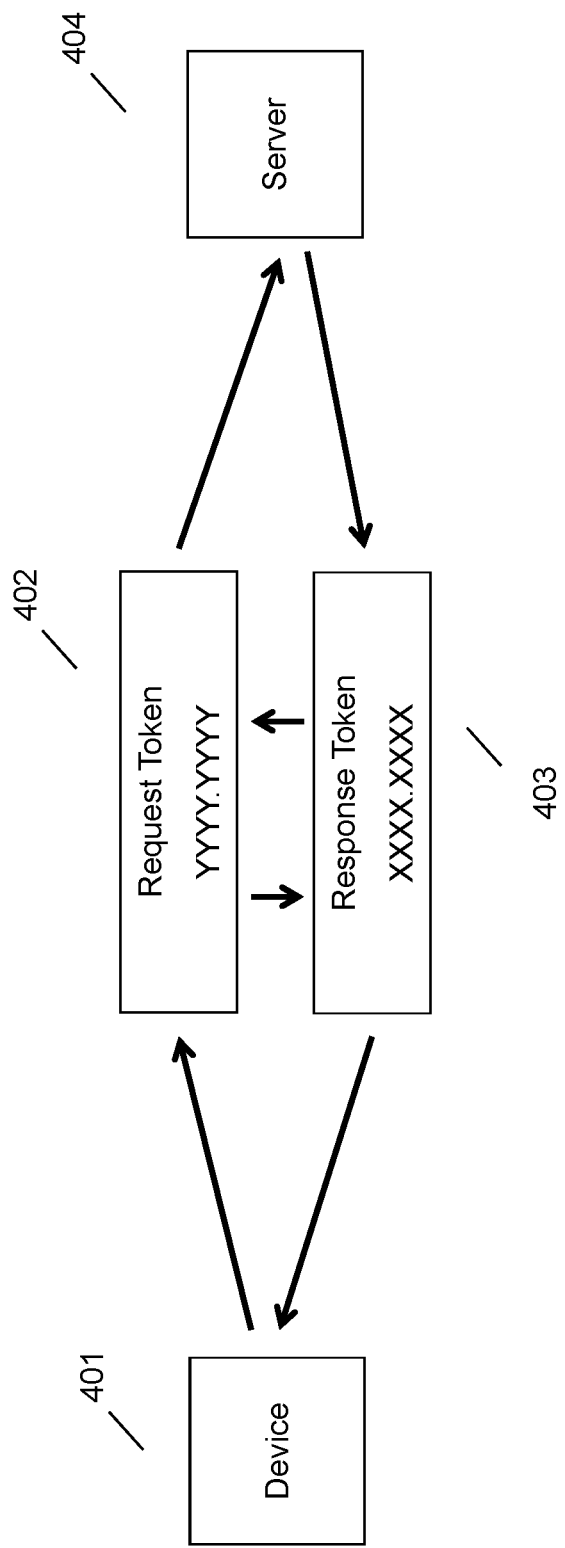
FIG. 4 illustrates an example communication flow for authenticating a device across an unsecure network utilizing a device registration token.

FIG. 4 illustrates a possible communication path between the device 401 and server 404. The device 401 sends a request token 402 that includes the device registration token. This request token 402, values utilized in generating the request token, and values known to the server and/or device are used by the server 404 to generate a response token 403. The response token 403 is then sent to the device 401 to be utilized in authenticating the device 401 at the server 404.

Thus, the described system and method provide a technical improvement over current authentication methods by providing a more robust one-time password-based mutual authentication method. The described system solves the problem of secure verification when the device is unable to connect directly to a verification server and where users are used to having to provide small, in length, tokens to verify the device. Thus, not only does the described system ensure that the device is a verified device even when the device is unable to connect directly to the verification server but it also mitigates different possible attacks while maintaining usability and security requirements.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which are executed via a processor of the device, implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a server from a device, a request for device authentication to access a secure service corresponding to the server across an unsecure network, wherein the secure service requires validation that the device is trusted to access the secure service based upon the request being received across an unsecure network, wherein the request comprises a device registration token unique to the device to validate the device as trusted;
   generating, at the server, a server shared registration key from the device registration token of the device and a private key of the server, wherein the generating comprises calculating and verifying a proof of work function, wherein the proof of work function is a hash of a device identifier and nonce utilized by the device in generating a device shared registration key utilized to generate the device registration token;
   verifying, at the server, the device registration token by comparing the device registration token to a function of the proof of work function and the server shared registration key;
   producing, at the server and responsive to verifying the device registration token, a one-time activation token, and sending the one-time activation token to the device;
   authenticating the device for access to the secure service, wherein the authenticating comprises a response time verification that determines whether the one-time activation token has been received within an allowed time frame, wherein the response time verification comprises comparing a receipt time of the one-time activation token at the server to a timestamp corresponding to generation of the device registration token and verifying the one-time activation token responsive to determining that the receipt time is within the allowed time frame with respect to the timestamp corresponding to generation of the device registration token; and
   granting, responsive to determining that the one-time activation token has been received within the allowed time frame, the device access to the secure service and denying, responsive to determining that the one-time activation token has not been received within the allowed time frame, the device access to the secure service.

2. The method of claim 1, wherein the device registration token is generated at the device and is based upon the device shared registration key generated at the device utilizing a private key of the device and a public key of the server.

3. The method of claim 2, wherein the device shared registration key is generated utilizing an elliptic curve Diffie-Hellman algorithm that utilizes the private key of the device and the public key of the server.

4. The method of claim 1, wherein the server shared registration key is generated utilizing an elliptic curve Diffie-Hellman algorithm that utilizes a private key corresponding to the server.

5. The method of claim 1, wherein the receiving comprises receiving the nonce utilized within the proof of work function.

6. The method of claim 1, wherein the device registration token is generated based upon a sequence number unique to the device.

7. The method of claim 6, wherein the one-time activation token is based upon an increment of the sequence number.

8. The method of claim 1, wherein the device registration token comprises the timestamp.

9. The method of claim 1, wherein the server comprises a database of device public keys.

10. A server, comprising:
   a processor; and
   a memory device that stores instructions executable by the processor to:
      receive, at the server from an electronic device, a request for device authentication to access a secure service corresponding to the server across an unsecure network, wherein the secure service requires validation that the electronic device is trusted to access the secure service based upon the request being received across an unsecure network, wherein the request comprises a device registration token unique to the electronic device to validate the electronic device as trusted;
      generate, at the server, a server shared registration key from the device registration token of the electronic device and a private key of the server, wherein the generating comprises calculating and verifying a proof of work function, wherein the proof of work function is a hash of a device identifier and nonce utilized by the electronic device in generating a device shared registration key utilized to generate the device registration token;
      verify, at the server, the device registration token by comparing the device registration token to a function of the proof of work function and the server shared registration key;
      produce, at the server and responsive to verifying the device registration token, a one-time activation token, and send the one-time activation token to the electronic device;
      authenticate the electronic device for access to the secure service, wherein the authenticating comprises a response time verification that determines whether the one-time activation token has been received within an allowed time frame, wherein the response time verification comprises comparing a receipt time of the one-time activation token at the server to a timestamp corresponding to generation of the device registration token and verifying the one-time activation token responsive to determining that the receipt time is within the allowed time frame with respect to the timestamp corresponding to generation of the device registration token; and
      grant, responsive to determining that the one-time activation token has been received within the allowed time frame, the electronic device access to the secure service and deny, responsive to determining that the one-time activation token has not been received within the allowed time frame, the electronic device access to the secure service.

11. The server of claim 10, wherein the device registration token is generated at the electronic device and is based upon the device shared registration key generated at the electronic device utilizing a private key of the electronic device and a public key of the server.

12. The server of claim 11, wherein the device shared registration key is generated utilizing an elliptic curve Diffie-Hellman algorithm that utilizes the private key of the electronic device and the public key of the server.

13. The server of claim 10, wherein the server shared registration key is generated utilizing an elliptic curve Diffie-Hellman algorithm that utilizes a private key corresponding to the server.

14. The server of claim 10, wherein the receiving comprises receiving the nonce utilized within the proof of work function.

15. The server of claim 10, wherein the device registration token is generated based upon a sequence number unique to the electronic device.

16. The server of claim 15, wherein the one-time activation token is based upon an increment of the sequence number.

17. The server of claim 10, wherein the device registration token comprises the timestamp.

18. A product, comprising:
   a storage device that stores code, the code being executable by a processor and comprising:
      code configured to receive, at a server from an electronic device, a request for device authentication to access a secure service corresponding to the server across an unsecure network, wherein the secure service requires validation that the electronic device is trusted to access the secure service based upon the request being received across an unsecure network, wherein the request comprises a device registration token unique to the electronic device;
      code configured to generate, at the server, a server shared registration key from the device registration token of the electronic device and a private key of the server, wherein the generating comprises calculating and verifying a proof of work function, wherein the proof of work function is a hash of a device identifier and nonce utilized by the electronic device in generating a device shared registration key utilized to generate the device registration token;
      code configured to verify, at the server, the device registration token by comparing the device registration token to a function of the proof of work function and the server shared registration key;
      code configured to produce, at the server and responsive to verifying the device registration token, a one-time activation token, and send the one-time activation token to the electronic device;
      code configured to authenticate the electronic device for access to the secure service, wherein the authenticating comprises a response time verification that determines whether the one-time activation token has been received within an allowed time frame, wherein the response time verification comprises comparing a receipt time of the one-time activation token at the server to a timestamp corresponding to generation of the device registration token and verifying the one-time activation token responsive to determining that the receipt time is within the allowed time frame with respect to the timestamp corresponding to generation of the device registration token; and
      code configured to grant, responsive to determining that the one-time activation token has been received within the allowed time frame, the electronic device access to the secure service and deny, responsive to determining that the one-time activation token has not been received within the allowed time frame, the electronic device access to the secure service.

* * * * *